United States Patent [19]

Gess

[11] 4,053,994
[45] Oct. 18, 1977

[54] EDUCATIONAL DEVICE

[76] Inventor: Diane Marlene Gess, 16 Charnwood Drive, Suffern, N.Y. 10901

[21] Appl. No.: 665,511

[22] Filed: Mar. 10, 1976

[51] Int. Cl.² .............................................. G09B 3/00
[52] U.S. Cl. ...................................................... 35/9 R
[58] Field of Search .............. 35/8 R, 9 R, 9 E, 9 F, 35/9 G, 9 H; 273/144 R, 144 A, 144 B, 145 B

[56] References Cited

U.S. PATENT DOCUMENTS

| | | | |
|---|---|---|---|
| 335,837 | 2/1886 | Peckham | 35/9 R X |
| 1,385,623 | 7/1921 | Kellogg | 35/1 X |
| 2,222,245 | 11/1940 | Steen | 35/9 R |
| 2,461,290 | 2/1949 | Maynard et al. | 198/248 |
| 2,522,226 | 9/1950 | Hood | 35/9 R X |
| 3,174,231 | 3/1965 | Schure | 35/9 H X |
| 3,189,342 | 6/1965 | Bocock | 35/9 R X |

*Primary Examiner* — William H. Grieb
*Attorney, Agent, or Firm* — Louis A. Tirelli

[57] ABSTRACT

A teaching device useful for reinforcing learning and presenting new information to an operator which is adapted for use with cards having related information on both sides of each card such as a question on one face and the answer on the reverse face, and includes an enclosed frame with an inlet opening for receiving the card obverse face up and an outlet opening for delivering the same card reverse face up with a stationary guide means for selectively moving the card from the inlet opening to the outlet opening while reversing the face of the card shown to the operator. A modification of the preferred embodiment described above includes by way of example a receptacle disposed at the outlet opening for receiving the exiting card from the outlet opening and stacking the cards on a deck of other like cards; this receptacle can include a movable cover to prevent reading of the reverse side of the exited card until the operator is ready. Further modifications can include distinctive matching marks on the inlet opening and the obverse face of the card to alert the operator to the proper side up position for inserting the card into the teaching device, and shaping the enclosed frame to appear to have a human shape or personality for operator comfort.

10 Claims, 9 Drawing Figures

EDUCATIONAL DEVICE

BACKGROUND OF THE INVENTION

This invention relates to an educational device for teaching and the like.

More particularly the invention relates to an educational device of the character hereinafter described for receiving a card having information printed on both sides thereof and accepting the card obverse face up so that information on the obverse face up or front face of the card can be read by an operator and then after receiving the card, delivering the card with the card reverse face up in position to allow the operator to read the reverse or opposite face of the card.

Some known types of teaching devices provide disks having on one face a question or interrogative suggestion and on the reverse face a corresponding reply thereto. However, such teaching devices such as the educational device of U.S. Pat. No. 335,837 (Peckham) are awkward to use, and require an aperture in the disk which interferes with the easy reading of the information on the disk. Further, the disks cannot be taken out of a set order if so desired by the operator since the disks are strung upon a rod or wire and are slidable along the rod or wire, but only from one adjacent disk to the next adjacent disk. This also limits the number of disks usable with the teaching device without destroying the portability of the teaching device.

A further disadvantage of this type of teaching device is that it is manually operated and the operator must physically slip the desired disk along the rod or wire to a position where the operator can read the reverse face of the disk and then rotate the disk so that the material faces the proper direction for easy reading by the operator. This requires a great deal of manipulative motion by the operator and can interfere with the learning process.

A further disadvantage of present day teaching devices and related apparatus such as U.S. Pat. No. 2,222,245 (Steen) is that all of the information is on the same side of the card and an operator can inadvertently read the answer to the question while reading the question. A still further disadvantage is the turning and difficult manipulation of the card into a box where the card is held in position under spring pressure and then sliding the card half-way out by finger pressure, and after mentally giving the answer withdrawing the card again by finger pressure.

Another disadvantage of present day teaching devices and related apparatus is the complexity of the mechanisms necessary to operate the device as well as the size and weight of the apparatus making it costly and stationary. Devices of this nature such as U.S. Pat. No. 2,522,226 (Hood) are much too expensive to produce for todays teaching market where school districts are finding themselves short of money and the taxpayers are up in arms over any increase in their taxes. Further such an item could never be sold by mail order catalogue as a specific teaching aid for a particular home market because of the bulk cost of manufacture. There is the further disadvantage that a trained mechanic would be necessary for any required repairs to the teaching apparatus of this like should repairs become necessary.

Related apparatus such as U.S. Pat. No. 3,189,342 (Bocock) only teach selective sorting of cards and fail to describe a useful teaching apparatus.

Likewise, related apparatus such as U.S. Pat. No. 2,461,290 (Maynard) have the disadvantage in that they fail to teach how the card is reversed so that the operator can view the obverse face of the card when it exits the teaching apparatus.

What is desired is an educational device that is portable, light weight and simple to manufacture at a low price, and does not require costly maintenance, while at the same time being easy to use by an operator and having cards for use therewith which clearly divide the question content and answer content to separate sides of the card. Further, the information on the card itself should be readable without apertures or other objectionable interferences placed in the way of the information. Lastly, the device should be simple to use even for a pre-school child and reliable, and the answers should always appear at the proper station without additional effort of the operator.

SUMMARY OF THE INVENTION

In accordance therewith the present invention provides an educational device which comprises an enclosed frame having an upright position and having an inlet opening for receiving the card in the obverse position into the frame. The frame also comprises an outlet opening for delivering the card outside of the frame, the outlet opening being spaced below the inlet opening and the frame having stationary guide means for selectively moving the card from the inlet opening to the outlet opening so that the card is delivered to the outlet opening with its reverse face up.

In one embodiment the guide means can comprise a chute interposed within the frame in the free falling trajectory of the card entering the inlet opening, the chute extending from above and opposite the inlet opening to the outlet opening. In this embodiment the card having been inserted into the inlet opening obverse face-up initially falls and strikes the chute with the lower free falling edge of the card, and this causes the opposite edge of the card to rotate about the lower free falling edge away from the inlet opening and the card lands on the chute reverse face-up and begins sliding along the chute to exit from the frame at the outlet opening.

In the above embodiment the outlet opening is substantially in vertical alignment with the inlet opening.

The embodiments described above can include a receptacle for the exited card which is disposed below and substantially in line with the outlet opening for receiving the card as it exits the outlet opening. The receptacle acts to stack each card exiting the outlet opening upon all other cards already exited from the outlet opening.

The receptacle can comprise a box having a parallelepiped configuration with a closed bottom and an open top and adapted to receive a separate cover. The receptacle is capable of use as a combination stacking device for a plurality of the cards and as a box for holding a plurality of the cards forming a series thereof.

The embodiment of the box can include at least one key shaped aperture formed in the frame below the outlet opening to receive a corresponding flanged male stud extending from the box whereby the box can be detachably connected to the frame when desired.

In another embodiment of the educational device a distinctive mark is placed on the outside of the frame adjacent and in association with the inlet opening therein. The distinctive mark is also placed on one face of the card intended for use with the educational device so that an operator can match the distinctive marks on the upright face of the card and on the inlet opening, and thereby place the card into the frame in the proper face-up orientation.

In another embodiment of the educational device the frame has a rectangular parallelepiped configuration.

A further embodiment of the educational device includes a semi-circular flat portion extending above the inlet opening and adorned to appear as a human face to give the educational device a human personality for the comfort of the operator. This would also include an animal or object.

Another embodiment of the educational device includes a writing tablet adjacent to the base of the frame for writing answers to questions appearing on the face of the card inserted into the inlet opening and facilitating the comparison of the answer written on the tablet to the answer appearing on the obverse face of the card.

Having briefly described the broad aspects of the present invention, it is a principal object thereof to provide an educational device which is easy to use even for a preschool child with few manipulative skills.

Another object of the instant invention is to provide an educational device which is portable and inexpensive to manufacture.

A further object of the instant invention is to provide an educational device which does not require periodic maintenance and can be repaired by an unskilled individual.

An additional object of the present invention is to provide an educational device which is adapted to receive a card with only a question showing at one station and to deliver the same card to another station with only an answer showing.

A further object of the present invention is to provide an educational device which is adapted for use with cards containing information thereon in various arts and skills for learning by operators having diverse backgrounds and skills and, therefore, such card material being flexible and immediately adaptable for use with a particular operator.

A still further object of the present invention is to provide an educational device which is adapted to receive a card which is integral and without thought distracting apertures therein.

BRIEF DESCRIPTION OF THE DRAWINGS

The present invention will be more readily apparent from an understanding of the following detailed description of one embodiment of the present invention when considered in conjunction with the accompanying drawings in which.

DESCRIPTION OF THE PREFERRED EMBODIMENT

Figure 1:
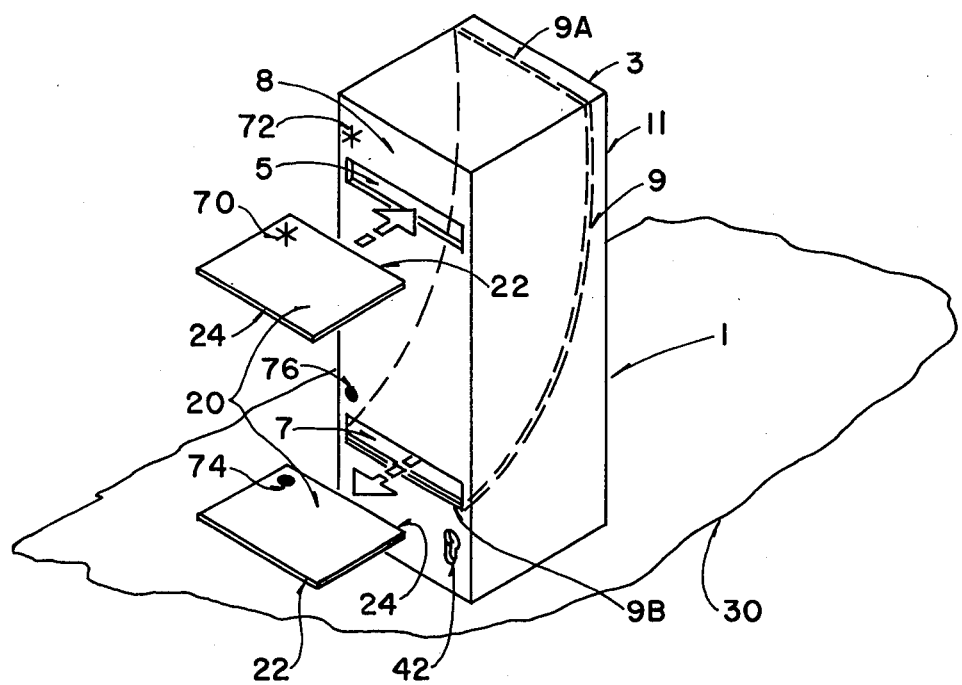
FIG. 1 is a perspective view of an educational device of the present invention.

It is to be noted in the drawings that similar parts of like members are given similar reference numerals throughout the separate figures of the drawings.

Referring to FIG. 1 there is shown an embodiment of the invention which is generally indicated at 1 and referred to as an educational device or teaching device and can also be used as a game device. Reference numeral 3 designates an enclosed frame which includes an inlet opening 5 and an outlet opening 7 formed in interior wall 8 of the enclosed frame 3. A guide means such as chute 9 is interposed within the enclosed frame 3. The chute 9 extends from above and opposite the inlet opening 5 to the outlet opening 7. One end 9a of the chute 9 is attached by adhesive or other similar means to the interior of wall 11 of the enclosed frame 3. Wall 11 is opposite the wall 8. The other end of chute 9 is attached by adhesive or other similar means to the interior of the opposite wall 8 at the bottom of the outlet opening 7 in position to allow an object such as a card 20 to exit smoothly along the chute 9 and out of the outlet opening 7. It should be stated, however, that the end 9a can be attached lower on the interior of wall 11 than the height of the inlet opening 5 so long as the chute 9 is on a sufficient slant to cause the card 20 to slide out of the outlet opening 7.

Figure 2:
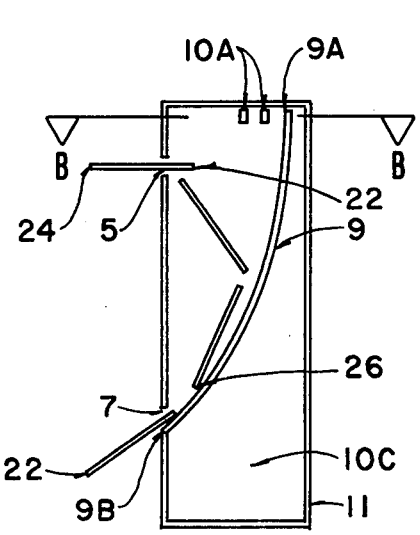
FIG. 2 is a view taken in longitudinal section from front to back of FIG. 1.
Figure 3:
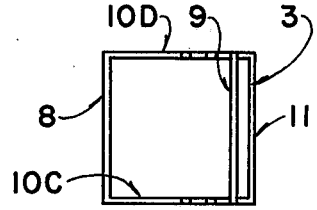
FIG. 3 is a sect. view of the educational device illustrating the embodiment of FIGS. 1 and 2, and taken along the line B—B of FIG. 2.
Figure 9:
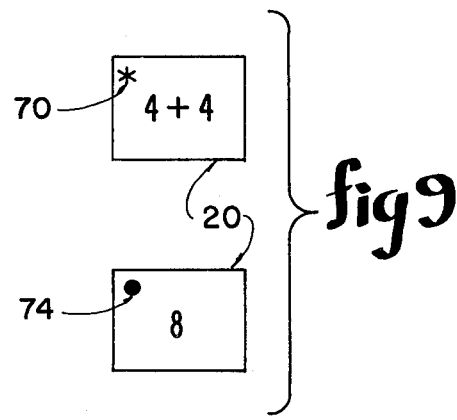
FIG. 9 shows diagrammatically cards for use in the educational device.

In the preferred embodiment the card 20 as shown in FIGS. 1, 2 and 9 can be inserted into inlet opening 5 obverse face-up as indicated by the upper card 20 shown in FIG. 9 allowing an operator to read the information on the obverse face of the card 20. FIG. 9 illustrates that the information which is contained on the card is separated into two parts. On the obverse face is a question or other desired statement, and on the reverse face shown by the lower card 20 in FIG. 9 is indicated the answer to the question or other related information desired.

By way of example, but not limiting the information that can be placed on card 20 is the following from FIG. 9. The specific card 20 belongs to a course in arithmetic. The obverse face asks the question "4 + 4" and the reverse face answers the question with the numeral "8" as shown in FIG. 9. The information on the obverse face is in position for viewing by the operator as he inserts the card 20 into the inlet opening 5, but the answer or information on the reverse face is hidden from view since the information is on the underside of the card 20 in the insertion position.

FIG. 2 is an alternate embodiment to the invention, and shows 9a of the chute 9 with tabs (unnumbered) to fit into notches 10a in the sidewalls 10c and 10d of the enclosed frame 3. This is desirable when the width of the card 20 is narrower than the chute 9. By use of the tabs (unnumbered), the chute 9 can be brought forward toward the inlet opening 5 to permit proper exiting of the card 20 from the outlet opening 7 with the reverse face upward.

Reference is now made to FIGS. 1 and 2 to show the handling of the card 20 by the educational device 1 so that the reverse face will be in position for viewing by the operator as the card 20 exits the outlet opening 7.

Although the following operation will be described it should not be considered a limitation of the invention and does not form a part of the invention but is only put forth for clarity of the reader.

The card 20 is inserted into the inlet opening 5 obverse face-up as shown in FIGS. 1, 2 and 9. The forward edge 22 of the card 20 enters the inlet opening 5 first and is followed by the trailing edge 24 of the card 20. As shown best in FIG. 2 as the card 20 enters the inlet opening 5, the weight of the unsupported forward edge 22 causes the forward edge 22 to dip below the height of the trailing edge 24. The card 20 after it fully enters the interior of the enclosed frame 3 then falls along a free trajectory with the forward edge 22 leading the fall and being lower than the trailing edge 24. As the leading edge 22 finally contacts the face of the chute 9 at 26 the trailing edge 24 is made to change its translational motion which has been abruptly stopped, into rotational motion about an axis defined by the forward edge 22 of the card 20. This causes the card 20 to lay flat against the top side (unnumbered) of the chute 9.

At this point all motion of the card 20 stops and gravity then begins its force which accelerates the sliding movement of the card 20 along the chute 9 with the forward edge 22 leading as the card 20 exits out of the outlet opening 7 with the reverse face in position for the operator to read the same. This permits the operator to check his answer against the cards answer and either learn or reinforce the operator's learned information.

As the card exits the enclosed frame 3 through the outlet opening 7 it can either come to rest and lay on the surface 30 on which the educational device is resting or various modifications of embodiments can be developed for containing the card 20 as will be shown below in FIGS. 4, 5 and 6.

Figure 4:
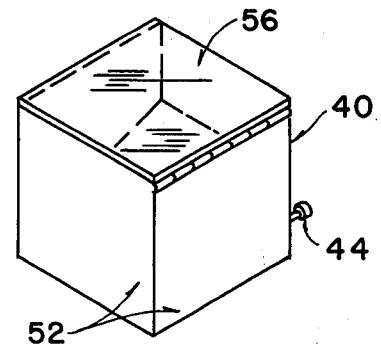
FIG. 4 is a perspective view of a receptacle with a cover and illustrates an alternate embodiment of an educational device provided with one or more keys for receiving the receptacle.

FIG. 4 shows one illustration of a receptacle 40 which can be separate or attached to the enclosed frame 3 by way of one or more apertures 42 on the wall 8 and corresponding male studs 44 on the receptacle 40. Such apertures 42 and male studs 44 are well known and by way of example only two different types are shown. In FIGS. 6 and 7 are shown rectangular aperatures 42 and male studs 44. The latter are "L" shaped and are inserted into the aperture 42 sufficiently so that the overhanging portion of the male studs 44 are within the interior of the enclosed frame 3. The whole receptacle 40 is then lowered to allow the lower part of the horizontal portion (unnumbered) of the "L" shaped male stud 44 to rest on the lower edge of the aperture 42. The overhanging portion of the male stud 44 then prevents the separation of the receptacle 40 from the enclosed frame 3.

Likewise, when the alternative embodiment of the aperture 42 is key shaped as shown in FIG. 1 the male stud 44 is a cylindrical stud as shown in FIG. 4 with the portion of the cylindrical stud closest to the receptacle 40 turned down to prevent separation as described above of the enclosed frame 3 and the receptacle 40.

Figure 5:
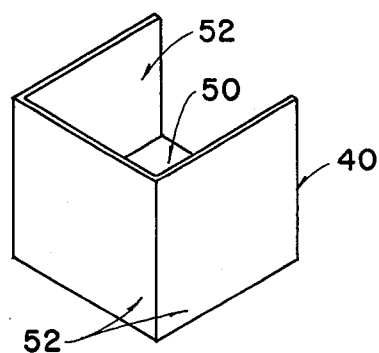
FIG. 5 is a perspective view of an alternate embodiment of the receptacle without a cover.

The preferred embodiment of receptacle 40 shown in FIG. 5 illustrates a flat surface 50 which is lower than the height of the outlet opening 7 so that the exiting card 20 can fall on top of any other card 20 already exited and thereby form a pack of cards. In this manner, a pack of cards 20 in one lesson can be kept together. The receptacle 40 can have 3 side walls 52 to prevent the cards 20 from slipping off the deck.

Figure 6:
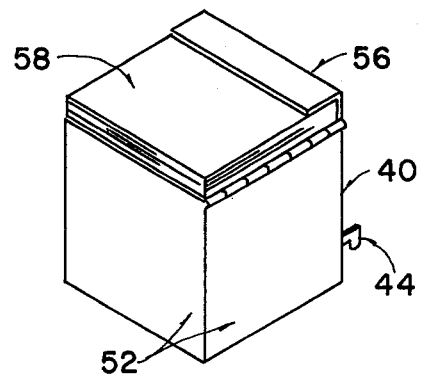
FIG. 6 is a perspective view of another alternate embodiment of a receptacle illustrating a pad attached to a cover thereon.
Figure 7:
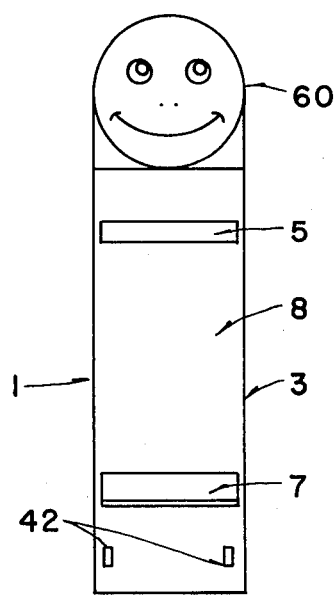
FIG. 7 is a front elevational view of an alternate embodiment of the present invention illustrating a human face added to the device.

In an alternate embodiment, the receptacle 40 can be as illustrated in FIG. 6 with a cover 56 to hide the answer until the operator is ready to read the same on the reverse face of card 20. The cover 56 can include a pad 58 or other means for writing on, to be attached to the cover 56 itself by known means.

FIG. 4 shows an alternate embodiment of the receptacle 40 illustrating a colored transparent cover 56 which can be used for color separation of the answer printed on face B of card 20. In this modification, the printing on face B of card 20 is made the same color as the colored transparent cover 56 so that when the card 20 is received in receptacle 40 the operator is unable to read the answer on face B because of the masking by the same colored cover 56. The operator must then lift the cover 56 in order to read the content of the answer printed on the reverse face of the card 20. Although color separation is well known in the art, this modification would be exciting to a young operator and would enhance his learning as well as his attention span.

In another modification the cover 56 can be slidably arranged, but this is not shown.

Figure 8:
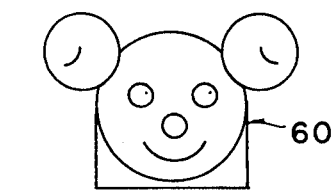
FIG. 8 is an alternate modification illustrating an animal face only.

An alternate modification shown in FIG. 7 shows a face 60 made up of a cardboard or other material which extends upwards from the top of wall 8 of the enclosed frame 3. This modification is not a functional embodiment but an aesthetic embodiment to relax the operator and cause him to be relaxed to get the most learning from use thereof of the educational device 1. The face 60 is shown in FIG. 7 as a human head, but can be an animal face or design as desired. FIG. 8 is an illustration of an animal head 60.

In a further embodiment which is shown in FIGS. 1 and 9, distinctive matching marks can be reproduced on each side of the card 20 with matching distinctive marks appearing adjacent to the inlet opening 5 and the outlet opening 7. By way of example, an asterisk 70 is shown as a distinctive mark on the obverse face of card 20 and a similar asterisk 72 is shown adjacent inlet opening 5 on the wall 8. This permits the operator to match the asterisks 70 and 72 and to cause his reading the proper face A of the card 20 as card 20 is being inserted into the inlet opening 5.

Similarly, a solid circle 74 has been reproduced on the reverse face of the card 20 and a similar solid circle 76 has been reproduced on the wall 8 adjacent to the outlet opening 7.

Of course, the obverse face in another embodiment, although not shown, could have one color which would be similar to the color on wall 8 surrounding inlet opening 5 and the reverse face of the same card could be given a dissimilar distinguishing color which would be similar to the color surrounding the outlet opening 7 on the exterior of the wall 8.

Although the present device has been described as an educational device, it can also be used as a game device.

It should be understood that the Figs. and the specific description thereof set forth in this application are for the purpose of illustrating the present invention and are not to be construed as limiting the present invention to the precise and detailed specific structure shown in the FIGS. as specifically described hereinbefore. Rather, the invention is intended to include substantially equipment construction embodying the basic teachings and inventive concept of the present invention.

What is claimed is:

1. An educational device adapted to receive a card in an obverse position, said card having information printed on both sides thereof, and of delivering said card reverse face-up which educational device comprises an enclosed frame having an upright attitute position, said frame having:
   a. A narrow inlet opening for receiving said card edgewise therethrough into said frame with said obverse face showing;
   b. A narrow outlet opening for delivering said card outside of said frame, said outlet opening being spaced below said inlet opening; and
   c. Stationery guide means for selectively moving said card from said inlet opening to said outlet opening so that said card is delivered to said outlet opening edgewise with its reverse face-up; whereby said card inserted into said inlet opening in an obverse position by an operator is delivered to said outlet opening reverse face-up.

2. An educational device as claimed in claim 1, wherein said stationary guide means comprises a chute interposed within said frame in the free falling trajectory of said card entering said inlet opening, said chute extending from above and opposite said inlet opening to said outlet opening, whereby said card having been inserted into said inlet opening in said obverse position initially falls and strikes said chute with the lower free falling edge of said card causing the opposite edge of said card to rotate about said lower free falling edge away from said inlet opening, and said card lands on said chute reverse face up begins sliding along said chute to exit from said frame at said outlet opening.

3. An educational device as claimed in claim 2, wherein said outlet opening is substantially in vertical alignment with said inlet opening.

4. An educational device as claimed in claim 2, wherein said frame has a rectangular parallelepiped configuration.

5. An educational device as claimed in claim 2 which includes a distinctive mark placed on the outside of said frame adjacent and in association with said inlet opening therein which said distinctive mark also is placed on one face of said card intended for use with said educational device so that an operator can match said distinctive mark on said upright face of said card and on said inlet opening and thereby place said card into said frame in the proper face-up orientation.

6. An educational device as claimed in claim 5, which further included a semi-circular flat portion extending above said inlet opening and adorned to appear as a human face to give said educational device a human personality for the comfort of the operator thereof.

7. An educational device as claimed in claim 1, which further includes a receptacle for said exited card which is cooperatively associated therewith and is disposed below and substantially in line with said outlet opening for receiving said card as it exits said outlet opening, said receptacle cooperatively acting to stack each said card exiting said outlet opening upon all other cards already exited from said outlet opening.

8. An educational device as claimed in claim 7, wherein said receptacle comprises a box having a parallelepiped configuration with a closed bottom and an open top and adapted to receive a separate cover, said receptacle being capable of use as a combination stacking device for a plurality of said cards and as a box for holding a plurality of said cards forming a series thereof.

9. An educational device as claimed in claim 7, wherein said receptacle includes in cooperative association a colored transparent cover which color of said cover matches the color of the printing of said card exited from said outlet opening, whereby said printing on said card is hidden from the view of the operator.

10. An educational device as claimed in claim 1, which further includes a cooperatively associated writing tablet adjacent to the base of said frame for writing answers to questions appearing on the obverse face of said card inserted into said inlet opening and facilitating the comparison of said answer written on said tablet to an answer appearing on the reverse face of said card.

* * * * *